United States Patent Office 2,746,983
Patented May 22, 1956

2,746,983

PRODUCTION OF COMMERCIAL PARAFFIN WAXES

Robert Lüben and Ewald Stiebling, Oberhausen-Sterkrade, Germany, assignors to Ruhrchemie Aktiengesellschaft, Oberhausen-Holten, Germany, a German corporation No Drawing. Application January 23, 1951,
Serial No. 207,441

13 Claims. (Cl. 260—450)

This invention relates to improvements in the production of commercial paraffin waxes. It relates particularly to the production of commercial paraffin waxes from industrial mixtures of high boiling hydrocarbons, such as, the products of catalytic carbon monoxide hydrogenation.

In the past slab paraffin having a pour point of 50/52° C. and hydrocarbons of a chain length of about 20 to 30 carbon atoms and hard paraffin having a pour point of 90° and over, and hydrocarbons of a chain length of approximately over 28–30 carbon atoms of commercial quality, could only be isolated from high-boiling products of catalytic carbon monoxide hydrogenation by the use of very cumbersome processing methods, inasmuch as the fatty acids, esters, alcohols and aldehydes present in small quantities have a disturbing influence. Similar difficulties also occur in connection with many high-boiling petroleum distillates which are used for the manufacture of commercial types of paraffin wax. Furthermore, the usual yellow to yellowish-brown color of the starting material could not always be completely eliminated by the customary processing.

One object of this invention is the production of paraffin waxes without the aforementioned difficulties. This and further objects will become apparent from the following description and the examples.

It has now been found according to the invention that these difficulties may be eliminated in a very simple manner by distilling the fractions boiling above from about 320 to 340° C. from the starting materials, i. e. the industrial hydrocarbon mixtures, such as the products of catalytic carbon monoxide hydrogenation, contacting the distillation residues with hydrogen at about 200 to 260° C. at a pressure of at least 5 kgs. in the presence of at least one of a metal and metal oxide catalyst and thereupon separating by extraction paraffin fractions of given melting points, and in particular slab paraffin wax and hard paraffin wax.

It has been found particularly advantageous if the process according to the invention is conducted with paraffin wax mixtures which have been produced with iron catalysts at medium pressure from gas mixtures containing carbon monoxide and hydrogen.

The hydrogen pressure best suited for the hydrogenation of the starting material depends, among other factors, on the initial boiling point of the starting material. In general, a hydrogen pressure of 5 kgs. per cm.$^2$ and over is sufficient in order to obtain commercial paraffin waxes in accordance with the invention. At lower pressures a complete hydrogenation does not take place, but the quality of the final product is fully sufficient for most industrial purposes, particularly with regard to its color. At gas pressures of up to 50 kgs./cm.$^2$ and more, complete hydrogenation takes place and the final product has at suitable temperatures an iodine number, neutralization number, saponification number and hydroxyl number of zero.

The hydrogen absorption is comparatively slight inasmuch as generally only small quantities of oxygen compounds or unsaturated compounds are to be hydrogenated. For this reason it generally suffices to restrict the action of the hydrogen to a period of about 60–90 minutes.

The catalysts best suited for the refining hydrogenation of the paraffin wax starting material are those containing nickel and magnesium oxide precipitated on kieselguhr, as used for example for the mechanizing of industrial gases. About 10 volumetric percent thereof is admixed with the starting material. Cobalt-containing catalysts as are customary in catalytic carbon monoxide hydrogenation, along with other hydrogenation catalysts may also be used. The hydrogenated product has a yellow color under mild hydrogenation conditions, and particularly under low hydrogenation pressures. When pressures of 30 kg. per cm.$^2$ and over are used, there are obtained white products consisting essentially of saturated paraffin hydrocarbons. If a fraction boiling over 340° is used as starting material, the final product consists of a mixture of hydrocarbons of molecular sizes of above $C_{18}$–$C_{19}$. In addition there are still small quantities of oily constituents present.

It may be noted that there is a direct relationship between the operating conditions of the hydrocarbon synthesis which gives the industrial hydrocarbons which are to be treated, and the hydrogenation temperature for the hydrocarbon fractions above 320–340° C. While in connection with hydrocarbons which were produced by means of iron catalysts at medium pressure from gas mixtures containing carbon monoxide and hydrogen, the most favorable hydrogenation temperature is between 240–260° and preferably at 250° C., in connection with hydrocarbons having the same boiling point obtained from a hydrocarbon synthesis with the use of cobalt catalysts, the optimum effect is obtained at hydrogenation temperatures of 210–230°, and preferably 220° C.

The crude paraffin treated in accordance with the invention can be spit up comparatively easily by extraction into oil-free slab paraffin wax containing paraffin hydrocarbons of molecular size $C_{20}$–$C_{30}$ and into oil-free hard paraffin wax containing paraffin hydrocarbons above $C_{30}$. This extraction can, for example, be carried out with a benzol propanol mixture from which a part of the solvent is distilled off after each crystallization and filtration stage. When so operating the solvent mixture consists of two components capable of forming a mixture having an azeotropic boiling point, one of said components being a good solvent and the other a poor solvent for high boiling paraffin hydrocarbons of above $C_{20}$.

The component in which the high boiling paraffin hydrocarbons are relatively insoluble should be present in an excess quantity as compared with the azeotropic ratio. The extraction solution obtained with this solvent mixture is cooled several times, one after the other, and freed each time from the paraffin portions which have separated out in solid form. A given portion of the solvent mixture is distilled off each time from the remaining solution freed from the solid portions. This method can be carried out with numerous solvent mixtures if the boiling point of the azeotropic mixture is preferably above 70° C. and if the boiling point of the second component, present in excess, is at least 10° higher so that a good separation of the two solvent components by distillation is possible. As the component in which the higher hydrocarbons are relatively less soluble, i. e. the higher boiling component present in excess, aliphatic alcohols and preferably isopropanol and normal propanol are particularly suitable. A solvent which consists of equal parts by volume of benzol and isopropanol and is composed by three parts by volume of a benzol isopropanol fraction having an azeotropic boiling point (66.6% benzol and 33.3% isopropanol) and 1 part by volume isopropanol is particularly suitable. Instead of isopropanol, normal propanol can also be used. Also mixtures of carbon tetrachloride or trichloroethylene or normal propanol are well suited for the process. The mixture ratio between the component which is a poor solvent for paraffin and the component which is a good solvent for paraffin depends on the starting material which is to be worked and the final products desired. When using these mixtures it is possible to split high boiling hydrocarbon fractions into hard paraffin, table paraffin and oily constituents. In such a case the components which are good solvents for paraffin and form the azeotropic mixture are completely distilled off after the first cooling. The remaining solvent then consists only of the component which is a poor solvent for paraffin, i. e. in general of propyl alcohol. After the second crystallization, i. e. after the separation of the slab paraffin, the remaining paraffin contains only soft paraffin and oily constituents, which are separated by distillation before the solvent is recycled.

The working of these mixtures can be carried out in a form which is simpler than the extraction method described, with the use of a single solvent. In this case lower alcohols, preferably propanol and isopropanol are used as extraction agents advisedly in such quantities that the oily portions are well dissolved after cooling has been effected, while the solid constituents remain practically undissolved in a suspension which can easily be pumped and filtered. Depending on the nature of the hydrogenated crude product, lower alcohols, preferably propanol or isopropanol, in quantities by weight equal to or greater than that of the hydrogenated crude product, are used. In practical operation they are heated together with the crude product generally under a reflux cooler and thereupon cooled to at least 20° C. and possibly even lower.

The suspension formed can then be filtered, the filtrate obtained is again separated by distillation into oil and propanol and the latter is returned to the process. The filter cake obtained is freed by distillation from included alcohol traces and can be poured into plates. The solvent distilled off in this connection may also be returned to the process. This manner of operation is especially suitable for the splitting of hydrocarbon mixtures into portions of less than $C_{20}$ and portions above $C_{20}$. To be sure, in principle, the portion above $C_{20}$ can again be split into slab paraffin wax and hard paraffin wax with the use of a single lower alcohol. In this event, however, additional operations are necessary. It is therefore advisable to use benzol-isopropanol solvent mixtures of the above described kind for the separation of hydrocarbon mixtures into: 1. Oil, 2. Slab paraffin wax, and 3. Hard parafin wax.

*Example 1*

As starting material, synthetic products, boiling above 340° C. which were obtained with iron catalysts from water gas at approximately 10–20 kg./cm.² gas pressure in straight gas passage, were used. This starting material was of grayish-yellow to light brown color and had the following properties:

| | |
|---|---|
| Pour point measured on a rotating thermometer _____ °C__ | 94.0 |
| Melting point measured in a closed capillary _____ °C__ | 104 |
| Penetration number _____ | 17.0 |
| Iodine number _____ | 3.0 |
| Neutralization number _____ | 0.9 |
| Saponification number _____ | 2.3 |
| Hydroxyl number _____ | 6.0 |
| Oil content _____percent__ | 10.1 |
| Passing over up to 340° C _____do____ | 1.2 |
| From 340–460° C _____do____ | 40.2 |
| Above 460° C _____do____ | 58.6 |

Of this crude paraffin, 3000 grams in molten condition were mixed with 300 cc. of a nickel—magnesium oxide—kieselguhr catalyst which consisted of 100 parts nickel, 12 parts magnesium oxide and 50 parts kieselguhr. The mixture was poured into a reaction vessel of high compression strength and a cubic content of 5,000 cc. and heated to 250° C. Thereupon a gas mixture consisting of 85 parts by volume hydrogen and 15 parts by volume nitrogen was forced in contact therewith at a pressure of up to 50 kg./cm.², and this pressure was maintained for 90 minutes with continuous agitation. A small absorption of hydrogen took place. After termination of the hydrogen treatment, the reaction mixture was discharged from the pressure vessel and separated from the catalyst in a heated filter press. 3000 grams final product of a completely white or colorless quality were obtained. All the fatty acids, esters, alcohols and aldehydes which had been present in the starting material had passed over into paraffin hydrocarbons. Only the ketones present in small amount remained unchanged. The final product had the following properties:

| | |
|---|---|
| Pour point measured on rotating thermometer _____ °C__ | 94 |
| Melting point measured in a closed capillary _____ °C__ | 105 |
| Penetration number _____ | 8.0 |
| Iodine number _____ | 0.0 |
| Neutralization number _____ | 0.0 |
| Hydroxyl number _____ | 0.0 |
| Oil content _____ | 12.7 |
| Initial boiling point _____ °C__ | 319 |
| Passing over up to 340° C _____percent__ | 3.1 |
| From 340–460° C _____do____ | 42.1 |
| Above 460° C _____do____ | 54.8 |

These figures show that as a result of the hydrogen treatment the lower boiling portions increased somewhat. For the same reason the oil content also increased somewhat. The penetration number decreased inasmuch as the softening constituents of the starting material, i. e. the esters and alcohols, were hydrogenated to parafin hydrocarbons. After the hydrogen treatment, the molten material had to be carefully protected from the action of air inasmuch as it is very sensitive to oxygen. The product of the hydrogen treatment was finely ground and treated with 15 liters of a solvent mixture which consisted of 3 parts by volume pure benzol and 2 parts by volume normal propyl alcohol. The hot extraction solution was cooled to 20° C. and separated from the solid constituents in a filter press. After the crystallized mass had been freed by distillation from the retained solvent there were obtained 2100 grams of hard paraffin wax of a melting point of 99.5° C.

From the cold extraction solution remaining after the hard paraffin wax separation, 9.5 liters of solvent were distilled off. Thereupon the solution was again cooled to 20° C. and the crystallized constituents were separated from the liquid phase in a filter press. The filter cake was freed by distillation from the solvent contained therein and gave 60 grams of table paraffin wax of a melting point of 50/52° C. The remaining solvent was freed from the oily constituents absorbed and recycled in the process.

*Example 2*

As a starting product, there was used a low temperature hydrogenation paraffin having the following properties:

| | |
|---|---|
| Initial boiling point _____ °C__ | 108 |
| Passing over up to 340° _____percent__ | 6.3 |
| 340–460° _____do____ | 87 |
| Over 460° _____do____ | 4.8 |
| Pour point measured on a rotating thermometer _____ °C__ | 51.0 |
| Melting point measured in a closed capillary__°C__ | 51 |
| Oil content (40×quantity of acetone) at 0° C _____percent__ | 20.84 |
| At 21° _____do____ | 13.65 |

| | |
|---|---|
| Sulfur | Traces |
| Iodine numbers | 0 |
| Neutralization number | 1.0 |
| Saponification number | 6.2 |
| Ester number | 5.2 |
| Hydroxyl number | 43.0 |
| CO number | 80.0 |
| Aniline point | 108.0 |

1000 grams of this material were hydrogenated with 100 cc. nickel-magnesium catalysts at 250° and 50 kg/cm² hydrogen pressure in an agitation autoclave for a time of reaction of 90 minutes.

After termination of the hydrogen treatment, the reaction mixture was discharged from the autoclave and separated from the catalyst in a heated filter press. The hydrogenation product was mixed after the filtration with the same quantity by weight of propanol at about 70°, thereupon cooled to 20° C. and stirred into a thin suspension. The oil-alcohol mixture was filtered off and the filter cake obtained was washed again with the same quantity of fresh propanol. After the alcohol still present in the cake was distilled off, the distillation residue (slab paraffin wax) was poured into plates. The oil-alcohol mixture obtained upon the filtration was separated into oil and propanol by distillation. The propanol obtained can be again fed to the process combined with the propanol obtained from the distillation of the filter cake. After this treatment, 850 grams of oil-free transparent, thoroughly typical slab paraffin having a pour point (measured on a rotating thermometer) of 54.3° C. and characteristic values of 0 was obtained in addition to 150 grams oil having a pour point of 20°.

*Example 3*

As starting material, there were used synthetic products boiling above 340° C. which were obtained by means of iron catalysts, from water gas at approximately 10–20 kg./cm.² gas pressure in straight gas passage. This starting material was of grayish-yellow to light brown color and had the following characteristics:

| | |
|---|---|
| Iodine number | 3.0 |
| Neutralization number | 0.9 |
| Saponification number | 2.3 |
| Hydroxyl number | 6.0 |

These products were hydrogenated in a column having a length of 5 m. and an inner diameter of 59 mm., with a nickel-magnesium oxide-kieselguhr catalyst of the same composition as was used in Example 1, at 250° C. and 5 kg./cm.² pressure continually in parallel flow with a gas mixture consisting of 85 parts hydrogen and 15 parts nitrogen.

After discharge from the hydrogenation column, the reaction product was collected in an autoclave, released from pressure and separated from the catalyst in a heated filter press. The final product obtained had a yellow color and the following characteristics:

| | |
|---|---|
| Iodine number | 0.0 |
| Neutralization number | 0.5 |
| Saponification number | 1.6 |
| Hydroxyl number | 2.0 |

As can be noted, the predominant quantities of the fatty acids, esters, alcohols, aldehydes and olefines which were present in the starting material have passed into paraffin hydrocarbons. The rate of flow was 1–1.5 kg./hour.

The final product obtained was thereupon split up in the known manner by extraction as in Examples 1 and 2 into the desired hydrocarbon groups.

*Example 4*

As starting material there were used synthetic products boiling above 340° C. which had been obtained by means of cobalt catalysts from water gas at approximately 10–20 kg./cm.² gas pressure in straight gas passage. This starting material was of grayish-yellow to light brown color and had the following properties:

| | |
|---|---|
| Iodine number | 4.0 |
| Neutralization number | 2.1 |
| Saponification number | 3.9 |
| Hydroxyl number | 7.5 |

These products were hydrogenated in a column having a length of 5 m. and an inner diameter of 59 mm. with a nickel-magnesium oxide-kieselguhr catalyst of the same composition as was used in Example 1 at 220° C. and 50 kg./cm.² pressure continually in parallel flow with a gas mixture consisting of 85 parts hydrogen and 15 parts nitrogen.

After emergence from the hydrogenation column, the reaction mixture was collected in an autoclave, released from pressure and separated from the catalyst in a heated filter press. The final product obtained was colorless and had characteristic numbers of 0.

As can be noted, the entire quantity of the fatty acids, esters, alcohols, aldehydes, and olefines which were present in the starting material passed into paraffin hydrocarbon. The rate of flow was 5–7 kg./hour.

The final product obtained may thereupon be split up in the known manner, as in Examples 1 and 2, by extraction into any desired hydrocarbon groups.

The above examples are given by way of illustration and not limitation, the invention being limited by the appended claims or their equivalents.

We claim:

1. Method for the production of commercial paraffin waxes from industrial hydrocarbon mixtures which comprises separating the fractions boiling above about 320–340° C. from such mixturse by distillation, thereafter contacting the said fractions with hydrogen at a temperature of about 200–260° C. and a pressure of at least 5 kg./cm.² in the presence of at least one of metal and metal oxide catalysts, thereupon contacting the hydrogenated fractions with an extraction solvent capable of dissolving any oily portions after cooling, while the solid constituents remain undissolved, and recovering paraffin fractions of predetermined melting points.

2. Method according to claim 1, in which the hydrocarbon mixtures are produced with iron catalysts at pressures of about 10–20 kg. per square centimeter from gas mixtures containing carbon monoxide and hydrogen.

3. Method according to claim 1, in which the metal in said catalyst is at least one member of the group consisting of nickel and cobalt.

4. Method according to claim 3, in which said catalyst is a nickel, magnesium oxide and kieselguhr catalyst, said catalyst being present in amount of about 10% by volume of the paraffin mixture.

5. Method according to claim 1, in which the hydrocarbon mixtures are obtained with iron catalysts from gas mixtures containing carbon monoxide and hydrogen at a pressure of about 10–20 kg. per square centimeter, and said hydrogen contacting is effected at temperatures of 240 to 260° C.

6. Method according to claim 1, in which the hydrocarbon mixtures are the products of the catalytic carbon monoxide hydrogenation with cobalt catalysts, and said hydrogen contacting is effected at temperatures of about 210–230° C.

7. Method according to claim 1, in which said extraction solvent is a lower alcohol.

8. Method according to claim 7, in which said alcohol is at least one member of the group consisting of propanol and isopropanol.

9. Method according to claim 8, in which said alcohol is present in amount sufficient to dissolve any oily portions after cooling, while the solid constituents remain undissolved.

10. Method according to claim 1, in which said extraction solvent is a solvent mixture containing two components capable of forming a mixture with an azeotropic boiling point, one of said components being a solvent and the other said component being substantially a poor solvent for high boiling paraffin hydrocarbons having at least 20 carbon atoms, said substantially poor solvent component being present in excess of the azeotropic ratio.

11. Method according to claim 10, in which said solvent mixture is cooled, the paraffin portions separated out in the form of a solid, a given portion of the solvent mixture distilled from the remaining solution; the entire operation being repeated at least one additional time.

12. Method according to claim 11, in which hard paraffin wax is separated out in the first cooling period, the azeotropic mixture completely distilled off from the remaining solvent mixture, slab paraffin wax separated from the remaining extraction solution by the subsequent coolings, the remaining solution separated by distillation into soft paraffin wax, oily constituents and solvent portions.

13. Method according to claim 12, in which said solvent mixture component which is a good solvent for high boiling paraffin hydrocarbons is at least one member of the group consisting of benzol, trichloroethylene and carbon tetrachloride, said substantially poor solvent being an aliphatic alcohol.

References Cited in the file of this patent

UNITED STATES PATENTS

| | | |
|---|---|---|
| 1,684,640 | Schmidt et al. | Sept. 18, 1928 |
| 2,229,658 | Jenkins | Jan. 28, 1941 |
| 2,351,345 | Kleine | June 13, 1944 |
| 2,471,914 | Sweetser | May 31, 1949 |
| 2,558,557 | Hess et al. | June 26, 1951 |
| 2,564,200 | Grekel | Aug. 14, 1951 |

OTHER REFERENCES

Storch, Columbic and Anderson, "The Fischer-Tropsch and Related Syntheses," pages 180–183, pub. by John Wiley & Sons., Inc., New York, 1951, based on footnote on page 180, "Ruhrchemie, 1938, F. I. A. T. Reel K21, Frames 1036–9."

Brennstoff-Chemie, vol. 21, pp. 157–67 (1940). (Article by Koch and Billig). Abstracted in Chemical Abtracts, vol. 35 (1941), page 3803.

U. S. Naval Technical Mission in Europe, Technical Report No. 248-45, "The Synthesis of Hydrocarbons and Chemicals from CO and $H_2$," September 1945, page 90. (This report was published as PB–22841, listed in bibliography of Scientific and Industrial Reports, Dept. of Commerce, OTS, vol. 2, No. 5, page 321, August 2, 1946).

Weil et al.: "Synthetic Petroleum from the Synthetic Petroleum from the Synthine Process," pp. 130–133. Pub. by Remsen Press Division, Chemical Publishing Co., Inc., New York, N. Y. (1948).

I. G. F., Synthetic Liquid Fuels Abstracts (New Series) vol. I, 1948, Bureau of Mines, Abstract No. 227, German Patent application I 68,608, Ivd/120, Jan. 8, 1941; Fiat Reel 164, Frames 03,197–03,202; PB L75, 191; OZ 12,534.

Jahrstorfer et al.: Synthetic Liquid Fuels Abstracts (New Series) vol. II, 1949, Bureau of Mines, Abstract No. 854, German Patent 732,957, March 19, 1943, Class 120/1.02, German Patent application I 62,522, June 19, 1935. FIAT Reel AA 88, Frames 03463–03464, PB L 70, 273.